US012609493B2

(12) United States Patent
Kameyama et al.

(10) Patent No.: US 12,609,493 B2
(45) Date of Patent: Apr. 21, 2026

(54) COAXIAL CABLE TERMINAL HAVING A PLURALITY OF RIBS

(71) Applicant: Yazaki Corporation, Tokyo (JP)

(72) Inventors: Isao Kameyama, Shizuoka (JP); Atsuhito Saito, Shizuoka (JP); Takuya Otake, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 301 days.

(21) Appl. No.: 18/505,649

(22) Filed: Nov. 9, 2023

(65) Prior Publication Data

US 2024/0195131 A1 Jun. 13, 2024

(30) Foreign Application Priority Data

Dec. 7, 2022 (JP) ................................ 2022-195792

(51) Int. Cl.
*H01R 24/40* (2011.01)
*H01R 9/05* (2006.01)

(52) U.S. Cl.
CPC ........... *H01R 24/40* (2013.01); *H01R 9/0518* (2013.01)

(58) Field of Classification Search
CPC .............................. H01R 24/40; H01R 9/0518
USPC .......................................................... 439/345
See application file for complete search history.

(56) References Cited

U.S. PATENT DOCUMENTS

| | | | | |
|---|---|---|---|---|
| 9,825,409 | B1 | 11/2017 | Kameyama | |
| 10,770,840 | B1 * | 9/2020 | Garver | H01R 24/40 |
| 2003/0224656 | A1 | 12/2003 | Yoshida | |
| 2019/0386439 | A1 * | 12/2019 | Kameyama | H01R 24/42 |
| 2021/0091518 | A1 * | 3/2021 | Baldus-Kunze | H01R 13/6271 |
| 2022/0131322 | A1 * | 4/2022 | Kameyama | H01R 24/40 |
| 2022/0311151 | A1 * | 9/2022 | Endo | H01R 24/40 |

FOREIGN PATENT DOCUMENTS

| | | | |
|---|---|---|---|
| JP | 2003-297493 | A | 10/2003 |
| JP | 2017-195034 | A | 10/2017 |
| JP | 2017-228447 | A | 12/2017 |

* cited by examiner

*Primary Examiner* — Tulsidas C Patel
*Assistant Examiner* — Jeffrey Mountain
(74) *Attorney, Agent, or Firm* — Banner & Witcoff, Ltd.

(57) ABSTRACT

There is provided a connector that is attachable to an end of a cable, the cable including an inner conductor, an insulator covering the inner conductor, and an outer conductor covering the insulator. The connector includes: an inner terminal attachable to the inner conductor; an insulating member that covers the inner terminal; and an outer terminal having an accommodating chamber capable of accommodating the insulating member, the outer terminal being connectable to the outer conductor. The insulating member includes a convex portion that is in contact with an inner wall of the accommodating chamber in a state where the insulating member is accommodated in the accommodating chamber.

5 Claims, 14 Drawing Sheets

COAXIAL CABLE TERMINAL HAVING A PLURALITY OF RIBS

CROSS-REFERENCE TO RELATED APPLICATIONS

This application is based on and claims priority under 35 USC 119 from Japanese Patent Application No. 2022-195792 filed on Dec. 7, 2022, the contents of which are incorporated herein by reference.

TECHNICAL FIELD

The present disclosure relates to a connector.

BACKGROUND ART

Various techniques have been proposed for, when holding a cable in a connector, stably holding an inner terminal of the connector and a core wire of the cable. JP2017-195034A discloses a method for connecting a shielded terminal that limits deterioration of transmission characteristics and causes a small material loss.

This connection method includes an inner terminal connecting step of connecting an inner terminal to a conductor at an end portion of an insulated electric wire, and a sheet folding step of folding an end portion in a longitudinal direction of an elongated electromagnetic shielding sheet including a metal sheet layer and an insulating film layer such that the insulating film layers face each other to form a folded portion. The connection method further includes a sheet winding step of covering the insulated electric wire by disposing the folded portion on the electromagnetic shielding sheet longitudinally including the metal sheet layer on an inner side such that an end portion of an insulator is exposed by a predetermined length, and a sheath winding step of winding a sheath member on the insulating film layer of the insulated electric wire. The connection method further includes an outer terminal connecting step of crimping a tubular outer terminal covering the inner terminal at the folded portion.

JP2017-228447A discloses a shielded connector that can easily automate an assembling process. The shielded connector includes an inner housing provided with a plurality of terminal accommodating chambers that accommodate respective inner terminals of shielded electric wires, the shielded electric wires being bundled by covering an outer periphery of a plurality of electric wires having the inner terminals attached to end portions with a covering member including a shielding member and an insulating member, and a shielded terminal in which the inner housing is assembled. In the inner housing, the plurality of terminal accommodating chambers are provided in two upper and lower stages, and the terminal accommodating chambers of the upper stage are provided with, on upper surfaces thereof, upper stage side terminal accommodating openings. The upper stage side terminal accommodating openings are opened to accommodate the inner terminals therein from one end surfaces on terminal insertion port sides of the inner terminals of the terminal accommodating chambers of the lower stage to walls constituting the other end surfaces opposite to the one end surfaces.

In the related art, an inner terminal and a core wire are accommodated in an outer terminal in an inclined state, which may lead to impedance disturbance. When the core wire remains deformed, the impedance may be not stable due to vibration during traveling of a vehicle.

SUMMARY OF INVENTION

The present disclosure provides a connector that can stably hold an inner terminal and a core wire.

According to an illustrative aspect of the present disclosure, a connector is attachable to an end of a cable, and the cable includes an inner conductor, an insulator covering the inner conductor, and an outer conductor covering the insulator. The connector includes: an inner terminal attachable to the inner conductor; an insulating member that covers the inner terminal; and an outer terminal having an accommodating chamber capable of accommodating the insulating member, the outer terminal being connectable to the outer conductor. The insulating member includes a convex portion that is in contact with an inner wall of the accommodating chamber in a state where the insulating member is accommodated in the accommodating chamber.

The present disclosure is briefly described above. Details of the present disclosure will be further clarified by reading modes for carrying out the disclosure described below with reference to the accompanying drawings.

DESCRIPTION OF EMBODIMENTS

First Embodiment

Figure 1:
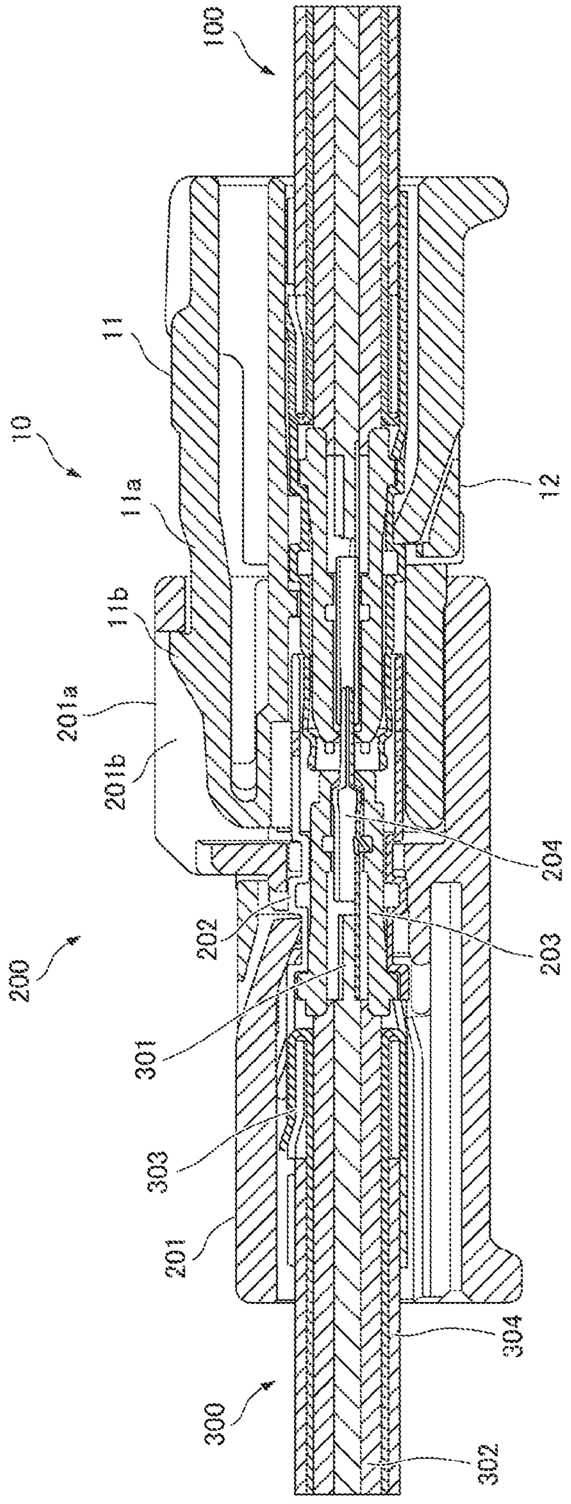
FIG. 1 is a longitudinal sectional view of a female connector and a male connector in a fitted state according to a first embodiment of the present disclosure.

Hereinafter, a female connector (also simply referred to as "connector") 10 according to a first embodiment of the present disclosure will be described with reference to the drawings. As shown in FIG. 1, the female connector 10 according to the present embodiment is connected to a distal end of a coaxial cable 100, and is fitted to a male connector 200 that is a counterpart connector. The male connector 200 is connected to a distal end of a coaxial cable 300 and is fitted to the female connector 10. By this fitting, the coaxial cable 100 of the female connector 10 and the coaxial cable 300 of the male connector 200 are electrically connected. The female connector 10 and the male connector 200 have a shielding function of reducing noise of electromagnetic waves entering from outside through the coaxial cables 100 and 300. The female connector 10 and the male connector 200 serve as, for example, high-frequency connectors that can transmit high-frequency signals.

First, the male connector 200 that is the counterpart connector and the coaxial cable 300 that transmits electric signals will be described. The male connector 200 includes a male outer housing 201, a male outer terminal 202, a male inner housing 203, and a male inner terminal 204.

The resin-made male outer housing 201 constitutes an exterior portion of the male connector 200, and has a hood portion 201*a* and a lock hole 201*b*. The hood portion 201*a* is a portion having a slightly larger diameter in the male outer housing 201. The rectangular lock hole 201*b* is formed in an upper surface of the hood portion 201*a*. The hood portion 201*a* and the lock hole 201*b* are portions that serve to fit with the female connector 10 as described later.

On an inner surface of the male outer housing 201, the male outer terminal 202, the male inner housing 203, and the male inner terminal 204 are arranged in this order from an outer side toward a center in a radial direction orthogonal to a longitudinal direction of the male connector 200. As described later, the metal-made male outer terminal 202 serves to ground electromagnetic wave noise entering from outside through the coaxial cable 300. The resin-made male inner housing 203 serves as an insulating member that electrically insulates the metal-made male outer terminal 202 from the metal-made male inner terminal 204.

The metal-made male inner terminal 204 is disposed at a radial center of the male connector 200, and is attached to a core wire 301 that is an inner conductor of the coaxial cable 300. The male inner terminal 204 transmits electric signals from the core wire 301 to the female connector 10 as described later.

Figure 2:
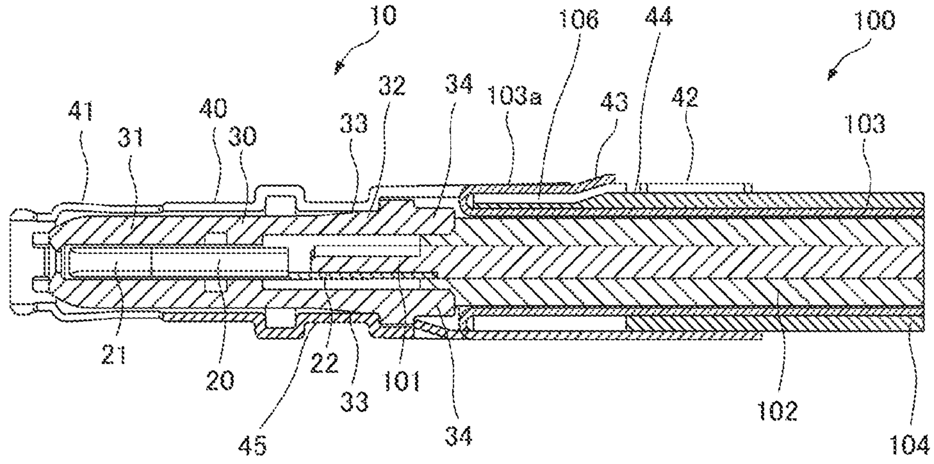
FIG. 2 is a longitudinal sectional view of the female connector according to the first embodiment.
Figure 3:
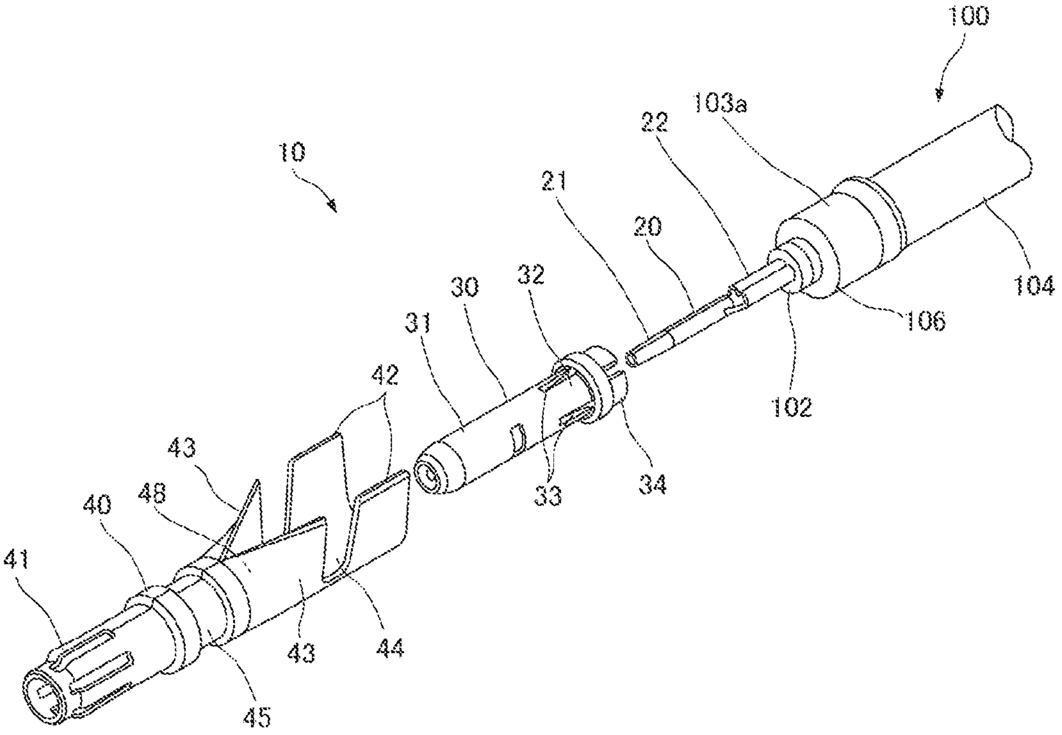
FIG. 3 is an exploded perspective view of the female connector according to the first embodiment.

As shown in FIGS. 1 to 3, the female connector 10 according to the first embodiment includes a female outer housing 11, a female outer terminal (also simply referred to as "outer terminal") 40, a female inner housing (also simply referred to as "insulating member") 30, and a female inner terminal (also simply referred to as "inner terminal") 20.

As shown in FIG. 1, the resin-made female outer housing 11 constitutes an exterior portion of the female connector 10, and has a lock arm 11*a* and a lock projection 11*b* that serve to fit with the male connector 200. The lock arm 11*a* has a cantilever shape, and the lock projection 11*b* is formed thereon. A user lowers the lock arm 11*a* while pressing an end portion of the lock arm 11*a*, and inserts the female connector 10 into the hood portion 201*a* of the male connector 200. When the user returns the lock arm 11*a* to an original position after the insertion, the lock projection 11*b* engages with the lock hole 201*b*, and the female connector 10 and the male connector 200 are fitted to each other.

The female outer housing 11 is equipped with a spacer 12 on a lower side. In an assembling process, the spacer 12 is locked from the lower side of the female outer housing 11, so that the female outer terminal 40 and the like inside the female outer housing 11 can be locked.

FIG. 2 shows a cross section of the female connector 10 in a state in which the female outer housing 11 is removed. An assembly in this state may be referred to as "female connector" or "connector". The female connector 10 is a connector that is attached to an end of the coaxial cable 100. The coaxial cable 100 is a cable including a core wire 101 that is an inner conductor, an insulator 102 covering the core wire 101, a braid 103 that is an outer conductor covering the insulator 102, and an outermost sheath 104. The braid 103 is connected to a ground wire (not shown), for example, and serves as a ground. Similar to the coaxial cable 100, the coaxial cable 300 in FIG. 1 also includes a core wire 301, an insulator 302, a braid 303, and a sheath 304.

The female connector 10 includes a configuration in FIG. 2 in addition to the female outer housing 11 shown in FIG. 1 only. That is, the female connector 10 includes the female inner terminal 20 that is attached to the core wire 101 of the coaxial cable 100, the female inner housing 30 covering the female inner terminal 20, and the female outer terminal 40 covering the female inner housing 30. On an inner surface of the female outer housing 11, the female outer terminal 40, the female inner housing 30, and the female inner terminal 20 are arranged in this order from an outer side toward a center in a radial direction of the female connector 10.

The metal-made female inner terminal 20 is disposed at a radial center of the female connector 10, and is connected to the male inner terminal 204 of the male connector 200 when the female connector 10 and the male connector 200 are fitted to each other. Accordingly, electric signals from the core wire 301 of the coaxial cable 300 are transmitted to the core wire 101 of the coaxial cable 100 through the male inner terminal 204 and the female inner terminal 20.

The resin-made tubular female inner housing 30 covers the female inner terminal 20 in the radial direction, and serves as an insulating member that electrically insulates the female inner terminal 20 from the female outer terminal 40 on an outer side. The metal-made female outer terminal 40 covers an entire circumference of the female inner housing 30, and is crimped to the braid 103 of the coaxial cable 100 to be electrically connected to the braid 103. The female outer terminal 40 includes a contact spring 41 at a distal end. When the female connector 10 and the male connector 200 are fitted to each other, the contact spring 41 comes into contact with an inner surface of the male outer terminal 202 and is electrically connected to the male outer terminal 202. Accordingly, the braid 303 of the coaxial cable 300, the male outer terminal 202, the female outer terminal 40, and the braid 103 of the coaxial cable 100 are electrically connected to each other and serve as the ground, and noise of electromagnetic waves entering from outside through the coaxial cable 300 can be shielded.

Next, the female outer terminal 40 will be described in detail. The female outer terminal 40 has a substantially cylindrical shape by, for example, punching and bending a metal plate. The female outer terminal 40 includes a cylindrical portion 45, a braid crimping piece (also simply referred to as "crimping piece") 43, and a sheath crimping piece 42. The cylindrical portion 45 includes an inner housing accommodating chamber 48 that is an accommodating chamber that can accommodate the female inner housing 30 therein, and accommodates the female inner housing 30. The braid crimping piece 43 is a metal piece crimped to the braid 103 of the coaxial cable 100. The sheath crimping piece 42 is a metal piece that is adjacent to the braid crimping piece 43 across a notch portion 44 in a longitudinal direction of the female outer terminal 40. A method for crimping will be described later.

Figure 4A:
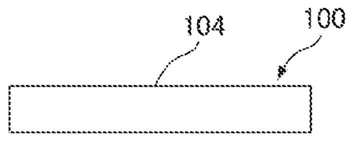
FIG. 4A shows a first step in a female connector assembling method according to the first embodiment.
Figure 4B:
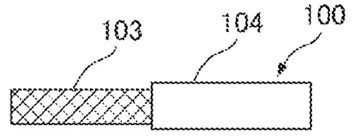
FIG. 4B shows a second step in the female connector assembling method according to the first embodiment.
Figure 4C:
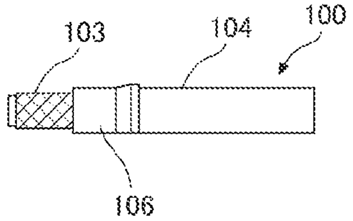
FIG. 4C shows a third step in the female connector assembling method according to the first embodiment.

The sheath 104 of the coaxial cable 100 covers the braid 103 excluding a distal end portion 105. The coaxial cable 100 is formed with a braid fold (also simply referred to as "folded portion") **103*a* that is a part of the distal end portion 105 of the braid 103 and is obtained by folding back the distal end portion 105 on the insulator 102. The braid fold 103*a* is folded back on a sleeve 106 attached to the coaxial cable 100 as described in an assembling method described later (see FIGS. 4C to 4**G).

Next, the female inner housing 30 will be described in detail. In the present embodiment, the female inner housing 30 is provided with a press-fitting rib 33 constituted by convex portions that are in contact with an inner wall of the inner housing accommodating chamber 48 of the female outer terminal 40 in a state of being accommodated in the inner housing accommodating chamber 48. The press-fitting rib 33 extends along a longitudinal direction of the female inner housing 30 on an outer periphery of the female inner housing 30, and a plurality of ribs protruding from the outer periphery are provided at intervals.

Accordingly, in the state in which the female inner housing 30 covering the female inner terminal 20 is accommodated in the inner housing accommodating chamber 48 of the female outer terminal 40, the press-fitting rib 33 is in contact with the inner wall of the inner housing accommodating chamber 48. Accordingly, inclination of the female inner terminal 20 and the core wire 101 in the female outer terminal 40 can be prevented. Accordingly, the impedance between the female inner terminal 20 and the female outer terminal 40 can be stabilized. With the stabilized impedance, transmission performances of the female connector 10 can be improved.

The press-fitting rib 33 includes a plurality of ribs (press-fitting ribs) separated from each other on the outer periphery of the female inner housing 30.

Accordingly, since the plurality of ribs constituting the press-fitting rib 33 are provided on the outer periphery of the female inner housing 30, the inclination of the female inner terminal 20 and the core wire 101 can be reliably prevented. In this example, four ribs constituting the press-fitting rib 33 are provided at equal intervals on the outer periphery of the female inner housing 30. Accordingly, the female inner terminal 20 can be reliably held in the inner housing accommodating chamber 48, and the inclination of the female inner terminal 20 and the core wire 101 can be further reliably prevented.

The inner housing accommodating chamber 48 is disposed along a central axis (the central axis in the radial direction) of the female outer terminal 40, and the press-fitting rib 33 is configured such that the female inner housing 30 is held in the inner housing accommodating chamber 48 along the central axis.

Accordingly, since the female inner housing 30 is held along the central axis of the female outer terminal 40 by the press-fitting rib 33, the impedance can be stabilized without being influenced by vibration or the like when the female connector 10 is mounted on a vehicle.

As illustrated in FIGS. 2 and 3, the female inner terminal 20 includes a fitting connection portion 21 that can be fitted to the male inner terminal 204 that is a counterpart terminal, and an electric wire connection portion 22 that is crimped to the insulator 102 of the coaxial cable 100. The female inner housing 30 includes a first portion 31 covering the fitting connection portion 21 and a second portion 32 covering the electric wire connection portion 22. In this configuration, the press-fitting rib 33 is provided on an outer periphery of the second portion 32.

Accordingly, since the female inner housing 30 includes the press-fitting rib 33 on the outer periphery of the second portion 32 covering the electric wire connection portion 22 of the female inner terminal 20, deformation of the electric wire connection portion 22 that is likely to deform can be prevented, and the impedance can be further stabilized.

The female inner housing 30 further includes at least a pair of flexible pieces 34 that sandwiches the insulator 102 of the coaxial cable 100. The flexible pieces 34 are provided at a rear end of the female inner housing 30 behind a locking projection that locks the female inner housing 30 to an inner wall of the outer terminal 40. In this example, the female inner housing 30 includes two pairs of flexible pieces 34. The flexible pieces 34 have a shape obtained by dividing an annular member into four equal parts in a circumferential direction. By sandwiching the insulator 102 between the flexible pieces 34, the core wire 101 is corrected such that the female inner terminal 20 is disposed at a center of the female inner housing 30. Accordingly, insulator layers and air layers of the female inner housing 30 and the coaxial cable 100 are uniform over the entire circumference, and thus the dielectric constant is stabilized and the impedance is adjusted.

Next, a method for assembling the female connector 10 will be described. FIGS. 4A to 4J show first to tenth steps of the assembling method. In the first step in FIG. 4A, the coaxial cable 100 is cut to a predetermined length. In the second step in FIG. 4B, the sheath 104 is peeled off to expose the braid 103. In the third step in FIG. 4C, the sleeve 106 is coated over and crimped to the braid 103.

Figure 4D:
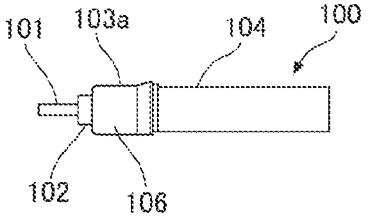
FIG. 4D shows a fourth step in the female connector assembling method according to the first embodiment.

In the fourth step in FIG. 4D, a distal end of the braid 103 is folded back toward and coated on the sleeve 106. A portion coated on the sleeve 106 is the braid fold **103*a*. After the folding, a part of the exposed insulator 102 is removed to expose the core wire 101**.

Figure 4E:
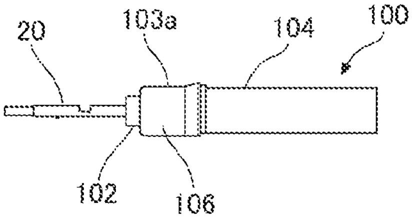
FIG. 4E shows a fifth step in the female connector assembling method according to the first embodiment.
Figure 4F:
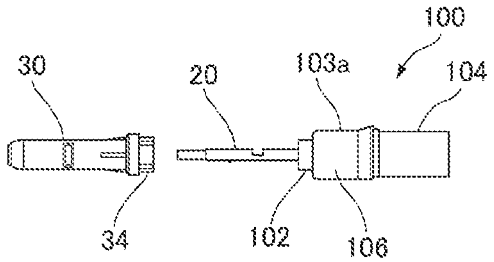
FIG. 4F shows a sixth step in the female connector assembling method according to the first embodiment.

In the fifth step in FIG. 4E, the female inner terminal 20 is attached (pressed) to the core wire 101. In the sixth step in FIG. 4F, the female inner terminal 20 is inserted into the female inner housing 30. At this time, the pair of flexible pieces 34 of the female inner housing 30 sandwich the insulator 102 of the coaxial cable 100, whereby the core wire 101 is corrected such that the female inner terminal 20 is disposed at the center of the female inner housing 30. The female inner terminal 20 includes a locking projection on an outer peripheral surface, and a position of the female inner terminal 20 is regulated relative to the female inner housing 30 by engaging the locking projection with a concave portion provided in an inner periphery of the female inner housing 30. Accordingly, the female inner terminal 20 is accommodated in the female inner housing 30 in a state in which the inclination of the core wire 101 is corrected.

Figure 4G:
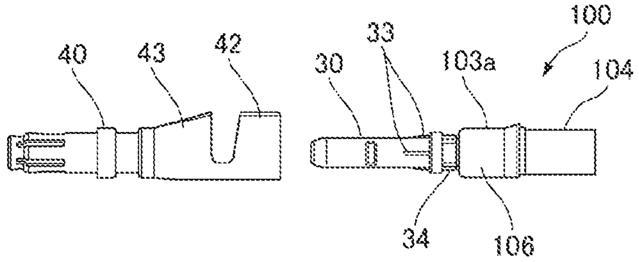
FIG. 4G shows a seventh step in the female connector assembling method according to the first embodiment.

In the seventh step in FIG. 4G, the female inner housing 30 and the female inner terminal 20 therein are inserted into the inner housing accommodating chamber 48 of the female outer terminal 40. At this time, the press-fitting rib 33 of the female inner housing 30 comes into contact with the inner wall of the inner housing accommodating chamber 48. Accordingly, inclination of the female inner terminal 20 and the core wire 101 in the female outer terminal 40 can be prevented.

Figure 4H:
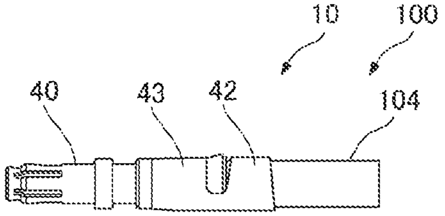
FIG. 4H shows an eighth step in the female connector assembling method according to the first embodiment.
Figure 4I:
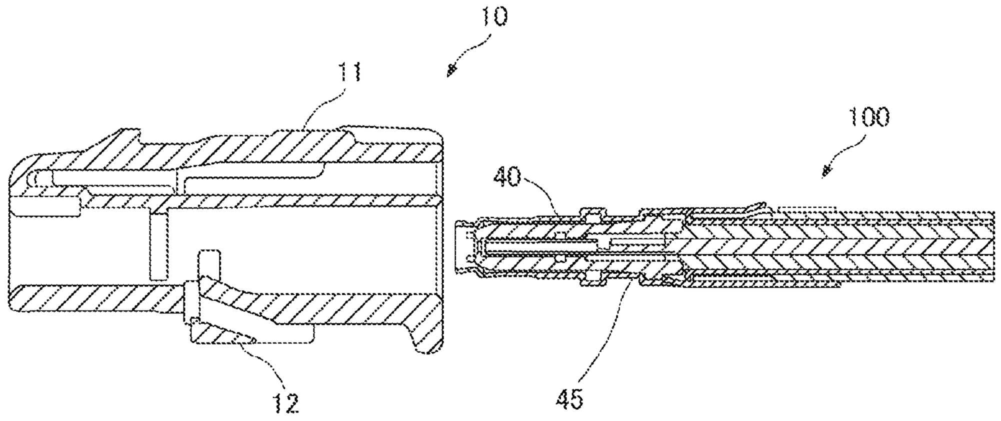
FIG. 4I shows a ninth step in the female connector assembling method according to the first embodiment.
Figure 4J:
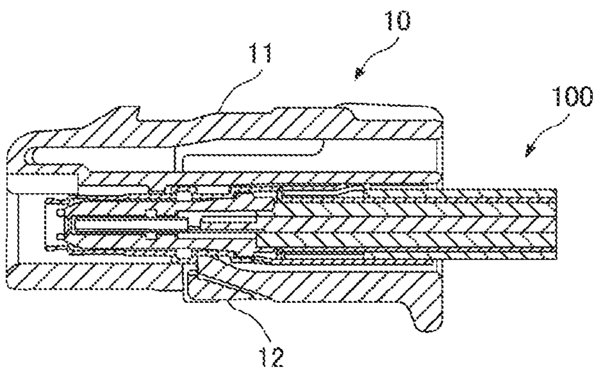
FIG. 4J shows a tenth step in the female connector assembling method according to the first embodiment.

In the eighth step in FIG. 4H, the state of FIG. 2 is implemented by crimping the sheath crimping piece 42 and the braid crimping piece 43 to the coaxial cable 100. In the ninth step in FIG. 4I, an assembly (the female connector 10) assembled up to FIG. 4H is inserted into the female outer housing 11. The assembly is held in the female outer housing 11 by locking a lance provided in the female outer housing 11 to the cylindrical portion 45 of the female outer terminal 40. In the tenth step in FIG. 4J, the displacement of the lance is prevented by installing the spacer 12 from the lower side of the female outer housing 11, and the female connector 10 is completed.

Second Embodiment

Figure 5:
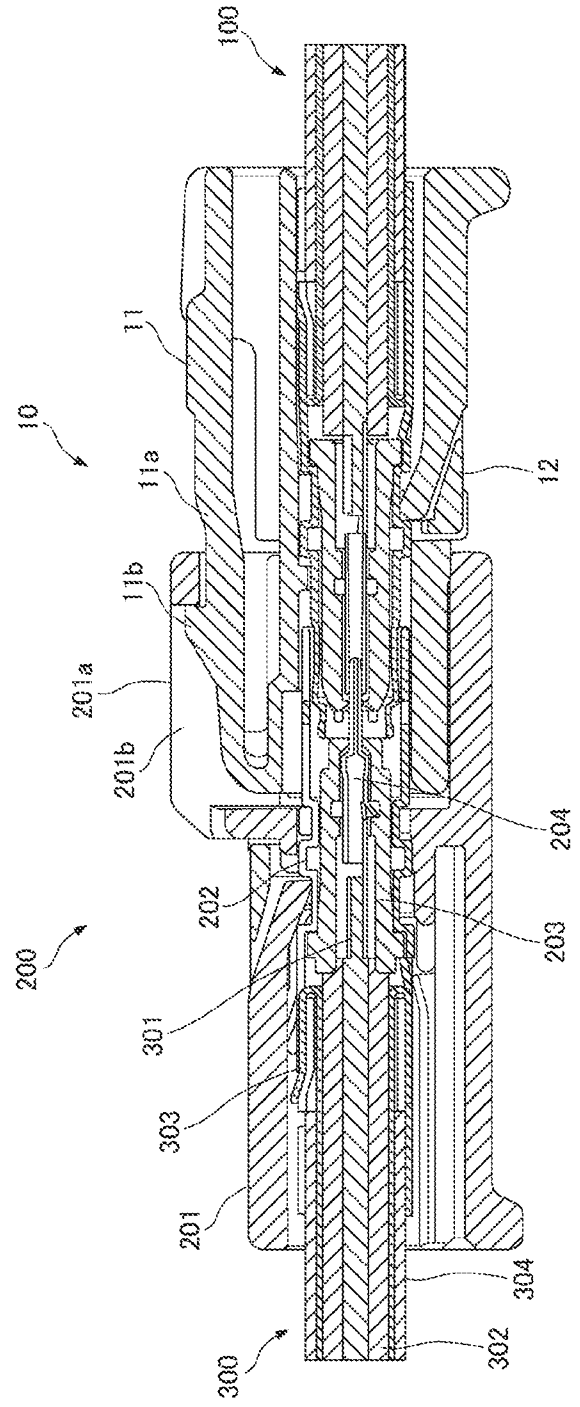
FIG. 5 is a longitudinal sectional view of a female connector and a male connector in a fitted state according to a second embodiment of the present disclosure.
Figure 6:
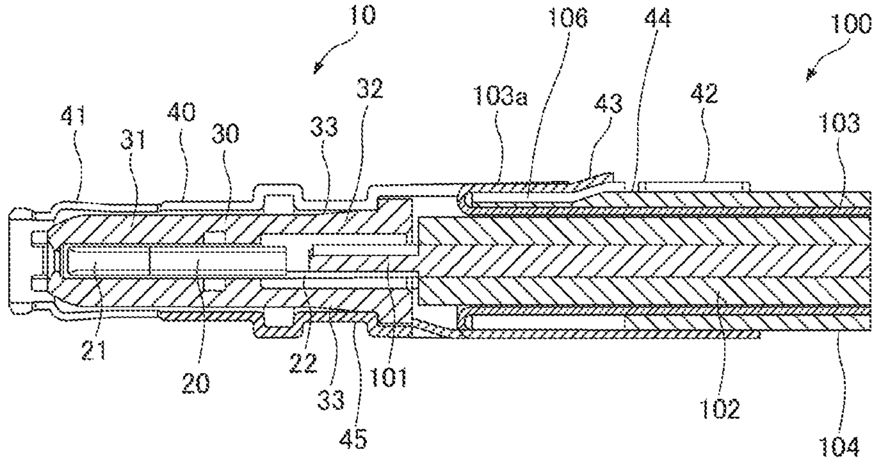
FIG. 6 is a longitudinal sectional view of the female connector according to the second embodiment.
Figure 7:
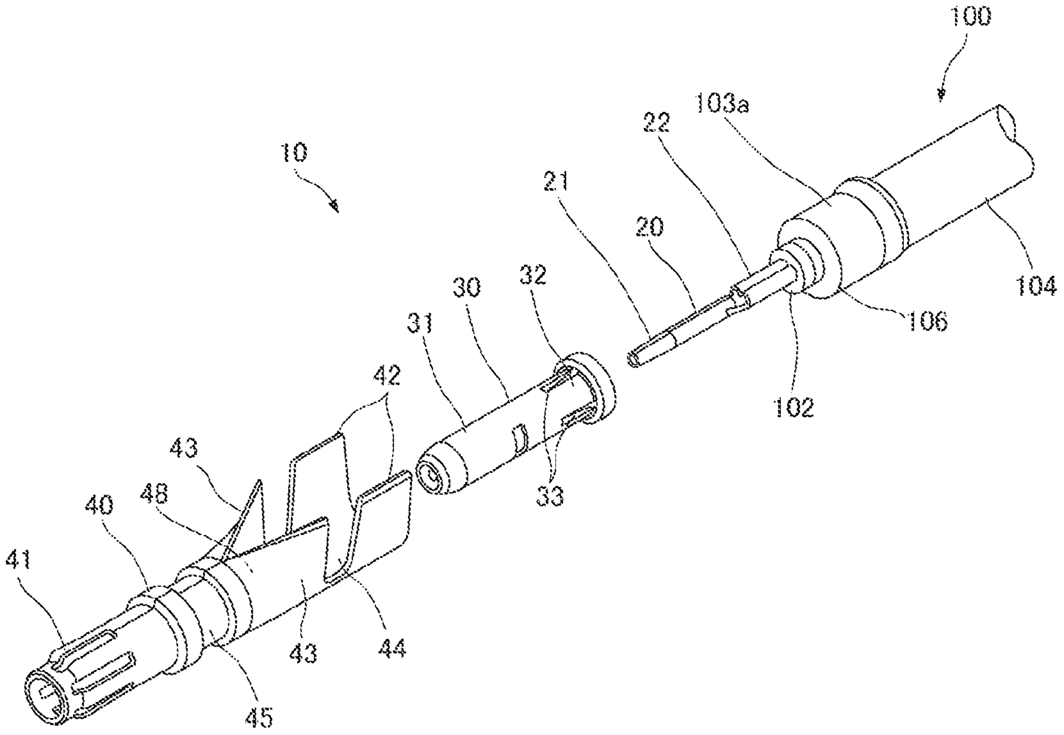
FIG. 7 is an exploded perspective view of the female connector according to the second embodiment.
Figure 8A:
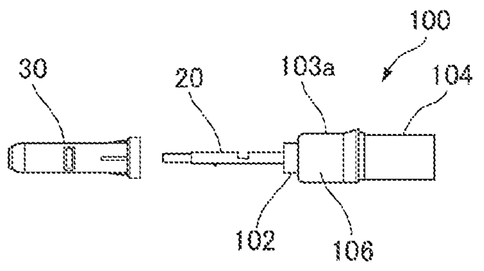
FIG. 8A shows a sixth step in a female connector assembling method according to the second embodiment.
Figure 8B:
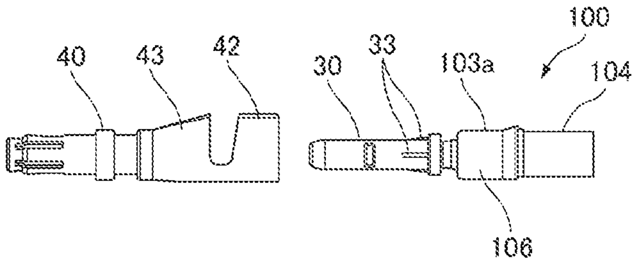
FIG. 8B shows a seventh step in the female connector assembling method according to the second embodiment.
Figure 8C:
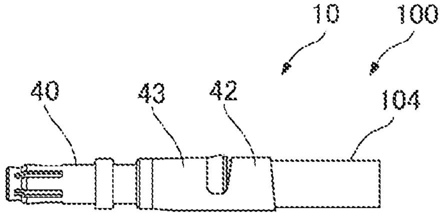
FIG. 8C shows an eighth step in the female connector assembling method according to the second embodiment.
Figure 8D:
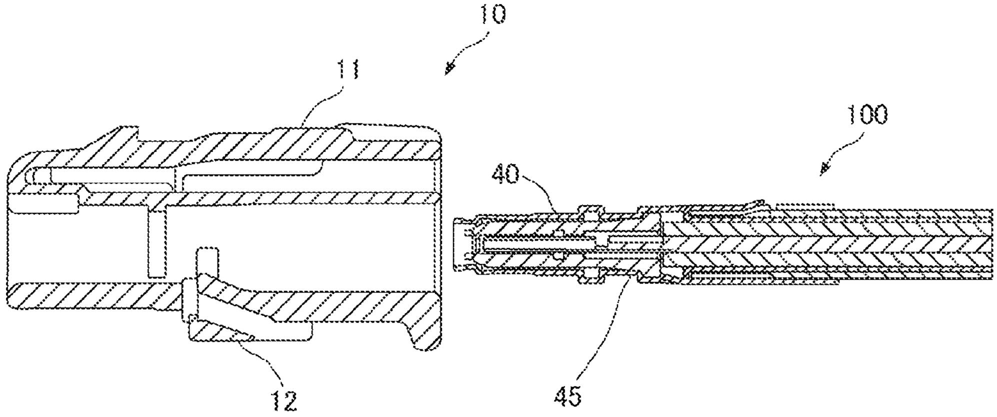
FIG. 8D shows a ninth step in the female connector assembling method according to the second embodiment.
Figure 8E:
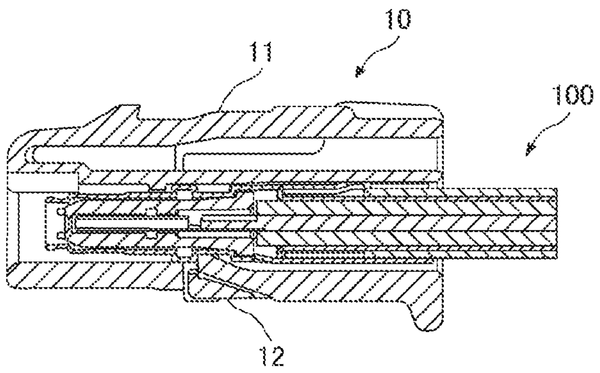
FIG. 8E shows a tenth step in the female connector assembling method according to the second embodiment.

FIGS. 5 to 7 show the female connector 10 according to a second embodiment. FIG. 5 corresponds to FIG. 1 according to the first embodiment. FIG. 6 corresponds to FIG. 2, and FIG. 7 corresponds to FIG. 3. In the present embodiment, the flexible pieces 34 are not provided at the female inner housing 30. Even in such a configuration, in a state in which the female inner housing 30 covering the female inner terminal 20 is accommodated in the inner housing accommodating chamber 48 of the female outer terminal 40, the press-fitting rib 33 is in contact with the inner wall of the inner housing accommodating chamber 48. Accordingly, inclination of the female inner terminal 20 and the core wire 101 in the female outer terminal 40 can be prevented. Accordingly, the impedance between the female inner terminal 20 and the female outer terminal 40 can be stabilized. With the stabilized impedance, transmission performances of the female connector 10 can be improved.

First to fifth steps of a method for assembling the female connector 10 according to the second embodiment are the same as those of the first embodiment (FIGS. 4A to 4E). FIGS. 8A to 8E show sixth to tenth steps of the assembling method according to the second embodiment. Although these steps are also substantially the same as those of the first embodiment, in the sixth step in FIG. 8A, different from FIG. 4F, the insulator 102 is not sandwiched by the flexible pieces 34. The other steps are the same as those of the first embodiment.

The present disclosure is not limited to the embodiments described above, and various modifications can be adopted within the scope of the present disclosure. For example, the present disclosure is not limited to the embodiments described above, and modifications, improvements, and the like can be appropriately made. Materials, shapes, dimensions, numbers, arrangement positions, and the like of constituent elements in the embodiments described above are freely selected and are not limited as long as the present disclosure can be implemented. For example, although the press-fitting rib 33 is provided on the female inner housing 30 in the above embodiments, the press-fitting rib may be provided in the male inner housing.

Here, features of the embodiments of the connector according to the present disclosure described above are briefly summarized and listed in the following first to fifth aspect.

According to a first aspect of the present disclosure, a connector (female connector 10) is attachable to an end of a cable (coaxial cable 100), and the cable includes an inner conductor (core wire 101), an insulator (102) covering the inner conductor, and an outer conductor (braid 103) covering the insulator. The connector (10) includes: an inner terminal (female inner terminal 20) attachable to the inner conductor; an insulating member (female inner housing 30) that covers the inner terminal; and an outer terminal (female outer terminal 40) having an accommodating chamber (inner housing accommodating chamber 48) capable of accommodating the insulating member, the outer terminal being connectable to the outer conductor. The insulating member includes a convex portion (press-fitting rib 33) that is in contact with an inner wall of the accommodating chamber in a state where the insulating member is accommodated in the accommodating chamber.

According to the connector having the configuration of the first aspect, in the state in which the insulating member covering the inner terminal is accommodated in the accommodating chamber of the outer terminal, the convex portion is in contact with the inner wall of the accommodating chamber. Accordingly, inclination of the inner terminal and the inner conductor in the outer terminal can be prevented. Accordingly, the impedance between the inner terminal and the outer terminal can be stabilized. With the stabilized impedance, transmission performances of the connector can be improved.

According to a second aspect of the present disclosure, in the connector of the first aspect, the convex portion includes a plurality of ribs (press-fitting rib 33) separated from each other on an outer periphery of the insulating member.

According to the connector having the configuration of the second aspect, the plurality of ribs are separated from each other on the outer periphery of the insulating member. Accordingly, the inclination of the inner terminal and the inner conductor can be reliably prevented.

According to a third aspect of the present disclosure, in the connector of the first aspect, the accommodating chamber is disposed along a central axis of the outer terminal, and the convex portion is configured such that the insulating member is held along the central axis in the accommodating chamber.

According to the connector having the configuration of third aspect, the insulating member is held along the central axis of the outer terminal by the convex portion. Accordingly, the impedance can be stabilized without being influenced by vibration or the like when the connector is mounted on a vehicle.

According to a fourth aspect of the present disclosure, in the connector of the first aspect, the inner terminal includes a fitting connection portion (21) configured to be fitted to a counterpart terminal and an electric wire connection portion (22) configured to be crimped to the insulator. The insulating member includes a first portion (31) that covers the fitting connection portion and a second portion (32) that covers the electric wire connection portion. The convex portion is provided on an outer periphery of the second portion.

According to the connector having the configuration of the fourth aspect, the insulating member has the convex portion on the outer periphery of the second portion that covers the electric wire connection portion of the inner terminal. Accordingly, deformation of the electric wire connection portion that is likely to deform can be prevented, and the impedance can be further stabilized.

According to a fifth aspect of the present disclosure, in the connector of any one of the first to fourth aspects, the insulating member includes at least a pair of flexible pieces (34) configured to sandwich the insulator.

According to the connector having the configuration of the fifth aspect, the inner conductor is corrected such that the inner terminal is disposed at the center of the insulating member (inner housing) by sandwiching the insulator between the flexible pieces. Accordingly, insulator layers and air layers of the insulating member and the cable are uniform over the entire circumference, and thus the dielectric constant is stabilized and the impedance is adjusted.

According to the present disclosure, the insulating member has the convex portion that comes into contact with the inner wall of the accommodating chamber of the outer terminal. Accordingly, inclination of the inner terminal and the inner conductor in the outer terminal can be prevented.

What is claimed is:

1. A connector attachable to an end of a cable, the cable including an inner conductor, an insulator covering the inner conductor, and an outer conductor covering the insulator, the connector comprising:

an inner terminal attachable to the inner conductor;

an insulating member that covers the inner terminal; and an outer terminal having an accommodating chamber capable of accommodating the insulating member, the outer terminal being connectable to the outer conductor, wherein the insulating member includes a convex portion that is in contact with an inner wall of the accommodating chamber in a state where the insulating member is accommodated in the accommodating chamber, and at least a pair of flexible pieces disposed at an end of the insulating member in an extending direction of the insulating member and spaced apart from the convex portion in the extending direction.

2. The connector according to claim 1, wherein the convex portion includes a plurality of ribs separated from each other on an outer periphery of the insulating member.

3. The connector according to claim 1, wherein the accommodating chamber is disposed along a central axis of the outer terminal, and the convex portion is configured such that the insulating member is held along the central axis in the accommodating chamber.

4. The connector according to claim 1, wherein the inner terminal includes a fitting connection portion configured to be fitted to a counterpart terminal and an electric wire connection portion configured to be crimped to the insulator, the insulating member includes a first portion that covers the fitting connection portion and a second portion that covers the electric wire connection portion, and the convex portion is provided on an outer periphery of the second portion.

5. The connector according to claim 1, wherein the insulating member includes a locking projection configured to lock the insulating member to the inner wall of the accommodating chamber, the locking projection disposed between the convex portion and the at least a pair of flexible pieces in the extending direction.

* * * * *